US010248979B2

(12) United States Patent
Livingston

(10) Patent No.: US 10,248,979 B2
(45) Date of Patent: Apr. 2, 2019

(54) COMMISSION ALLOCATION BASED ON ELECTRONIC INFORMATION CONSUMPTION

(71) Applicant: QUANTIFY LABS, INC., Toronto (CA)

(72) Inventor: Blair Livingston, Toronto (CA)

(73) Assignee: Quantify Labs, Inc., Toronto (CA)

( * ) Notice: Subject to any disclaimer, the term of this patent is extended or adjusted under 35 U.S.C. 154(b) by 490 days.

(21) Appl. No.: 14/709,051

(22) Filed: May 11, 2015

(65) Prior Publication Data

US 2015/0324876 A1 Nov. 12, 2015

Related U.S. Application Data

(60) Provisional application No. 61/991,677, filed on May 12, 2014.

(51) Int. Cl.
*G06Q 10/10* (2012.01)
*G06Q 30/06* (2012.01)
*G06Q 40/00* (2012.01)

(52) U.S. Cl.
CPC ............ *G06Q 30/06* (2013.01); *G06Q 10/10* (2013.01); *G06Q 40/00* (2013.01)

(58) Field of Classification Search
CPC .......................... G06Q 30/06; G06Q 30/0201
USPC ........................................................... 705/35
See application file for complete search history.

(56) References Cited

U.S. PATENT DOCUMENTS

| 5,712,979 A | 1/1998 | Graber et al. |
|---|---|---|
| 2002/0042821 A1 | 4/2002 | Muret et al. |
| 2007/0179873 A1* | 8/2007 | Solberg ................. G06Q 40/00 705/35 |

(Continued)

FOREIGN PATENT DOCUMENTS

| WO | 0211067 A1 | 2/2002 |
|---|---|---|
| WO | 02077746 A2 | 10/2002 |

OTHER PUBLICATIONS

European Patent Application No. 15167349.8 Extended Search Report dated Sep. 22, 2015.

*Primary Examiner* — Robert R Niquette
*Assistant Examiner* — Liz P Nguyen
(74) *Attorney, Agent, or Firm* — Perry + Currier Inc.

(57) ABSTRACT

Commission mappings for a content producer party are generated based on tracked interactions with distributed content by content consumer computers operated by a content consumer party. The distributed content originates from content producer computers operated by the content producer party. The tracked interactions are indicative of engagement with the distributed content by the content consumer computers. The commission mappings are transformed into an aggregated commission mapping for the content consumer party and the content producer party by correlating the commission mappings to the content consumer party and the content producer party and by processing correlated tracked interactions of the commission mappings into a quantified engagement of the content consumer party with the distributed content produced by the content producer party. The aggregated commission mapping is sent via a computer network to one or more computers operated by the content consumer party or the content producer party.

24 Claims, 8 Drawing Sheets

(56) References Cited

U.S. PATENT DOCUMENTS

2010/0293059 A1    11/2010  Davidson
2015/0052129 A1*  2/2015  Galvin, Jr. ......... G06Q 30/0201
                                                        707/731

* cited by examiner

COMMISSION ALLOCATION INTERFACE
300

Welcome, Ray Fink of IB Pension Fund. Below is a summary of the content providers whose content you found interesting during Q1. Suggested votes are provided. Please review, and optionally modify votes, and submit for commission allocation for Q2.

| Provider | Organization | Content Summary | Votes | Modify Votes |
|---|---|---|---|---|
| Nora Jones | Big Bank | 5 morning notes (click for details) | 3.50 | |
| Jake Hacket | ABC Broker | 1 alert (click for details) | 1.23 | |
| Lionel Kayle | Small Bank | 2 articles, 1 alert (click for details) | 0.75 | |

320  322  324  326  328

SUBMIT

FIG. 8

COMMISSION ALLOCATION BASED ON ELECTRONIC INFORMATION CONSUMPTION

CROSS-REFERENCE TO RELATED APPLICATIONS

This application claims the benefit of U.S. App. No. 61/991,677, filed May 12, 2014, which is incorporated herein by reference.

FIELD

The present invention relates to a system and method for distributing information. More specifically, the present invention relates to a system and method for allocating commissions based on tracked access and/or usage of such information.

BACKGROUND

In various industries, commissions are known to be distributed from one side to another side, where such sides contain complementary parties participating in various transactions. Technical problems in allocating commissions include lack of accuracy, delay, and lack of data integrity. Known computer systems for allocating commissions do not efficiently associate allocation data to underlying data concerning the transactions (or other considerations) that form the basis for the allocation in a way that preserves accuracy and data integrity. Such systems are also susceptible to delay, in that they may not be configured to conduct efficient data communications over a network and may require human intervention. Further, such system can often suffer from encroachment of non-deterministic data, whether provided by humans or other sources, which cannot be mapped to underlying data concerning the transactions (or other considerations).

While commissions are typically due from a buyer to a seller in response to a sale of goods, in some cases there will be multiple sellers from which the goods could have been purchased (at the same price, same terms, etc). In such cases, the selection by the buyer of which seller to purchase from can be made based upon a variety of other criteria. For example in the financial area, pre-sales support such as ongoing access to good research information, etc. (i.e., value added services) can all be considered by a buyer as valuable services and can be used in selecting one seller from among many to complete a transaction and thereby allowing the seller to earn commission.

However, as such value added services can occur a significant period of time before a sales transaction completes, it is possible that the buyer forgets or undervalues these value added services provided by a seller and completes the transaction with a seller that did not provide the value added services. It is also possible that, for a variety of reasons, a buyer may decide to deal with a different seller than a seller who provided value added services. Finally, in the financial industry, to prevent potentially improper transactions regulators are often interested in the criteria used by a buyer in selecting a particular seller and it may be difficult for a buyer to subsequently justify why a transaction was closed with a particular seller.

A variety of existing systems have been employed for attempting to track the use of and value of such value added services to buyers. In perhaps the most widely used system in the financial markets, buyers vote, at regular intervals, on the value of the value added services provided to them during the relevant period by each seller with which they interact. The number of votes a seller receives can be used by a buyer to weight future allocations of purchase transactions between sellers. For example, at the end of a calendar quarter seller A may receive thirty percent of the votes from a buyer, while seller B receives fifty percent and seller C receives twenty percent. In such an example, the buyer may decide that, next quarter, it will direct fifty percent of its purchases through seller B, thirty percent through seller A and twenty percent through seller C.

Such a voting system, in theory, tracks value added services, as well as potentially other factors and such systems are common in the financial industry, where buy-side parties vote quarterly to allocate commissions to sell-side parties.

As mentioned above, one concern with such a system, and others, is that many of the factors that influence commission voting are not available for scrutiny by industry regulators, the public, and even the parties themselves. Industry regulators have an interest in making sure that commission allocation is transparent, deterministic, or otherwise quantifiable. The public may wish to understand how an industry operates so that it can be properly regulated and so that retail aspects of the industry are fully understood. Further, a party that does not receive an expected commission has an interest in understanding the rationale, so that the party may modify their operations to bring greater efficiency to the industry. Further, in some circumstances a party which determines that they are providing the value added services to a buyer who is paying corresponding commissions to other sellers (either intentionally or by accident) can approach the buyer and discuss the situation to attempt to remedy it.

Hence, conventional commission allocation schemes are susceptible to misuse, lack transparency, and can be inaccurate and inefficient. The state of the art lacks a system that can easily and automatically allocate commissions based on quantifiable or knowable factors in a transparent, accurate, and efficient manner.

SUMMARY

According to one aspect of the present invention, a method of commission allocation in a computer system includes generating commission mappings for a content producer party based on tracked interactions with distributed content by content consumer computers operated by a content consumer party. The distributed content originates from content producer computers operated by the content producer party. The distributed content is distributed via a computer network to the content consumer computers. The tracked interactions are indicative of engagement with the distributed content by the content consumer computers. The method further includes transforming the commission mappings into an aggregated commission mapping for the content consumer party and the content producer party by correlating the commission mappings to the content consumer party and the content producer party and by processing correlated tracked interactions of the commission mappings into a quantified engagement of the content consumer party with the distributed content produced by the content producer party. The method further includes sending the aggregated commission mapping via the computer network to one or more computers operated by the content consumer party or the content producer party.

Transforming the commission mappings into the aggregated commission mapping can be performed according to periodic logic that defines a duration of time over which the tracked interactions occurred.

The commission mappings can further be based one or more interaction rule sets, each interaction rule set of the one or more interaction rule sets defining one or more rules for assigning a weighting to a tracked interaction.

Transforming the commission mappings into the aggregated commission mapping can include normalizing assigned weightings to votes of a vote allocation configured by the content consumer party and specific to a predetermined period, the vote allocation being for effecting payment of commission by the content consumer party to the content producer party.

Different vote allocations for different content consumer parties can be associated with different interaction rule sets.

The method can further include outputting a calculated vote allocation based on the commission mappings to a particular content consumer computer, and receiving a different vote allocation from the particular content consumer computer to update the commission mappings before transforming the commission mappings into the aggregated commission mapping.

A particular interaction rule set of the one or more interaction rule sets can be configured to assign different weightings to different kinds of tracked interactions.

The particular interaction rule set can be configured to assign a weighting to a tracked interaction of opening an email message containing a content item of the distributed content, the weighting being less than a weighting assigned to a tracked interaction of viewing the content item for a specified duration of time.

A particular interaction rule set can be configured to assign one or more weightings to a tracked interaction of forwarding an email message containing a content item of the distributed content or to a tracked interaction of activating a hyperlink within a content item of the distributed content.

The method can further include generating commission mappings for different content producer parties, the distributed content originating from content producer computers operated by the different content producer parties.

The method can further transforming the commission mappings into aggregated commission mappings for different content consumer parties and the different content producer parties.

The different content producer parties can include sellers of financial services and third parties that are not sellers of financial services.

The method can further include tracking interactions of the content consumer computers with the distributed content to obtain the tracked interactions.

Tracking interactions can be performed asynchronously to generating commission mappings and transforming the commission mappings into the aggregated commission mapping.

According to another aspect of the present invention, a commission allocation engine includes allocation processing logic configured to generate commission mappings for a content producer party based on tracked interactions with distributed content by content consumer computers operated by a content consumer party. The distributed content originates from content producer computers operated by the content producer party. The distributed content is distributed via a computer network to the content consumer computers. The tracked interactions are indicative of engagement with the distributed content by the content consumer computers. The allocation processing logic is further configured to transform the commission mappings into an aggregated commission mapping for the content consumer party and the content producer party by correlating the commission mappings to the content consumer party and the content producer party and by processing correlated tracked interactions of the commission mappings into a quantified engagement of the content consumer party with the distributed content produced by the content producer party. The commission allocation engine further includes an interface coupled to the allocation processing logic and configured to send the aggregated commission mapping via the computer network to one or more computers operated by the content consumer party or the content producer party.

The allocation processing logic can be configured to transform the commission mappings into the aggregated commission mapping according to periodic logic that defines a duration of time over which the tracked interactions occurred.

The commission mappings can be further based one or more interaction rule sets, each interaction rule set of the one or more interaction rule sets defining one or more rules for assigning a weighting to a tracked interaction.

The allocation processing logic can be configured to transform the commission mappings into the aggregated commission mapping by normalizing assigned weightings to votes of a vote allocation configured by the content consumer party and specific to a predetermined period, the vote allocation being for effecting payment of commission by the content consumer party to the content producer party.

Different vote allocations for different content consumer parties can be associated with different interaction rule sets.

The interface can be further configured to output a calculated vote allocation based on the commission mappings to a particular content consumer computer, and to receive a different vote allocation from the particular content consumer computer to update the commission mappings before transformation into the aggregated commission mapping.

A particular interaction rule set of the one or more interaction rule sets can be configured to assign different weightings to different kinds of tracked interactions.

The particular interaction rule set can be configured to assign a weighting to a tracked interaction of opening an email message containing a content item of the distributed content, the weighting being less than a weighting assigned to a tracked interaction of viewing the content item for a specified duration of time.

A particular interaction rule set can be configured to assign one or more weightings to a tracked interaction of forwarding an email message containing a content item of the distributed content or to a tracked interaction of activating a hyperlink within a content item of the distributed content.

The allocation processing logic can be configured to generate commission mappings for different content producer parties, the distributed content originating from content producer computers operated by the different content producer parties.

The allocation processing logic can be further configured to transform the commission mappings into aggregated commission mappings for different content consumer parties and the different content producer parties.

The different content producer parties can include sellers of financial services and third parties that are not sellers of financial services.

The allocation processing logic can be stored in memory and executed by a processor of one or more server computers.

According to another aspect of the present invention, a content distribution system includes a commission allocation engine, as discussed above, and a message tracking engine configure to track interactions of the content consumer computers with the distributed content to obtain the tracked interactions.

The commission allocation engine can be configured to generate commission mappings and transform the commission mappings into the aggregated commission mapping asynchronously to the message tracking engine to tracking interactions.

BRIEF DESCRIPTION OF THE DRAWINGS

It is an object of the present invention to provide a novel system and method for collecting and distributing information which obviates or mitigates at least one disadvantage of the prior art.

Preferred embodiments of the present invention will now be described, by way of example only, with reference to the attached Figures.

FIG. 8 is a schematic diagram of a portion of a user interface for commission allocation.

DETAILED DESCRIPTION

Figure 1:
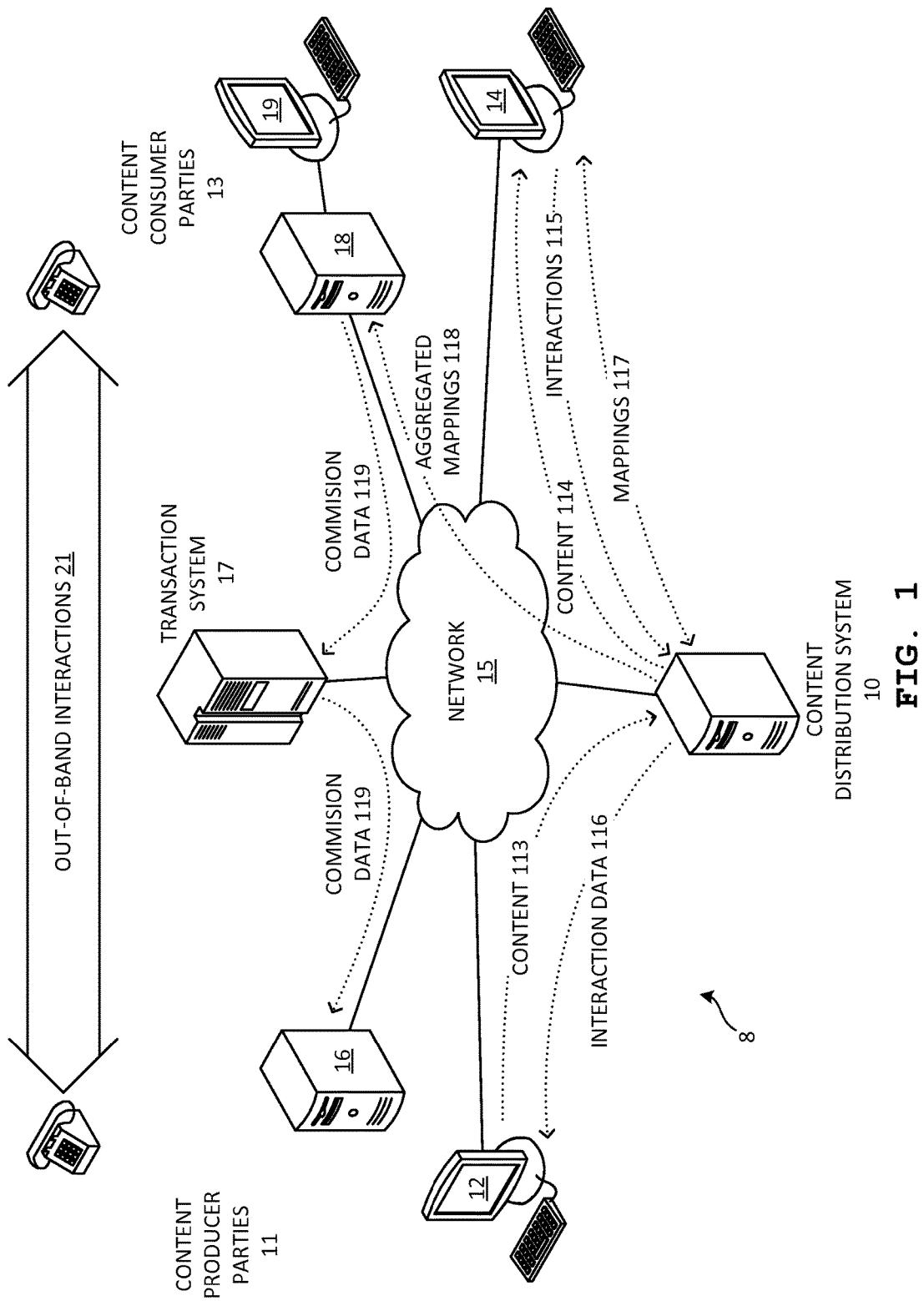
FIG. 1 is a block diagram of a system for commission allocation.

FIG. 1 shows an overall system 8 for commission allocation according to an embodiment of the present invention. Commission allocation can generally be considered as designating commissions related to various transactions. Commission allocation need not include effecting actual monetary payment. Moreover, a commission allocation does not necessarily compel any party to make a payment, and rather may be used by parties to simply measure various transactions or may be used as one factor of several to be considered when making commission payments. Commission allocation can designate commissions to be paid in the future, such as at the end of next quarter. Commission allocation, hence, may represent the desire of a first party to carry out a certain quantity of transactions with a second party to which the commissions are allocated. Alternatively or additionally, commission allocation can include designating commissions for past trades.

The system 8 includes one or more content producer parties 11 and one or more content consumer parties 13 that are communicatively connected via a network 15, such as a public wide-area computer network (e.g., the Internet), a private network such as a local-area network (LAN) or virtual private network (VPN), or a combination of such. Each of the content producer parties 11 and content consumer parties 13 can be physically and logically distinct and can include one or more computers and/or computer networks controlled by a different party, such as various sellers, purchasers, and content producers. Each of the content producer parties 11 and content consumer parties 13 can be a group (e.g., associated with a particular investment portfolio), an individual user, a computer-implemented process, a division of an organization, an entire organization, a combination of such, or similar. Parties 11, 13 may also change over time, as groups or organizations change, and are not particularly limited. In the examples discussed herein, content producers can also be (but need not be) sellers of financial instruments, whereas content consumers are generally buyers of such financial instruments. Although one content producer party 11 and one content consumer party 13 are shown for clarity, the number of such is not limited by the techniques discussed herein.

The commission allocation system 8 further includes a content distribution system 10 that is connected to the network 15. The content distribution system 10 includes one or more computers, which can be referred to as servers, and can include one or more processors and memory for storing processor-executable programs and data. The components of the content distribution system 10 that will be described herein can each be implemented on one or more of the computers. Other systems and methods that can be used with or in place of the content distribution system 10 are discussed in U.S. application Ser. No. 14/528,494, filed Oct. 30, 2014, which is incorporated herein by reference.

The system 8 further includes a financial transaction computer system 17 that is connected to the network 15. The financial transaction computer system 17 includes one or more computers, which can be referred to as servers, operating on one or more sub-networks controlled by one or more financial institutions, such as banks and the like. The financial transaction computer system 17 is configured to process financial transactions among the content producer parties 11 and the content consumer parties 13.

A plurality of content producer computers 12 can connect to the content distribution system 10 via the network 15 to interact with the content distribution system 10. The content producer computers 12 are operated by the content producer parties 11, as for example human operators, programs executing on the computers 12, a combination of such, or similar. Each content producer party 11 can also include one or more content producer servers 16, which can be configured to store records of financial transactions and other information.

An example of a content producer party is a brokerage that buys and sells stocks and other financial instruments. The brokerage operates as a content producer party 11 and various content producer users (e.g., brokers and their staff) operate content producer computers 12. Another example of a content producer party is an individual content producer user, such as a person working in academia or a freelance operator, who operates his/her own content producer computer 12.

A plurality of content consumer computers 14 can connect to the content distribution system 10 via the network 15 to interact with the content distribution system 10. The content consumer computers 14 are operated by the content consumer parties 13, as for example human operators, programs executing on the computers 14, a combination of such, or similar. Each content consumer party 13 can also include one or more content consumer servers 18, which can be configured to store records of financial transactions and similar information. A payment control computer 19 can be connected to the content consumer servers 18 to allocate commissions outside the domain of the content distribution system 10, issue commission payments via the financial transaction computer system 17, and perform similar operations.

An example of a content consumer party is an investment fund that invests in stocks and other financial instruments. The investment fund operates as a content consumer party 11 and various content consumer users (e.g., fund managers and their staff) operate content consumer computers 14. Content consumer parties also include recipients who have received the content from other content consumer parties, such as can happen, for example, when an original or intended recipient of a content-bearing email forwards the email to another user.

Generally, the term "content producer" refers to users, parties, firms, organizations, and components involved in generating and publishing content about various financial instruments, products, markets, segments, and similar. Content producers can also be sellers of financial services, such as trade brokering services, and may be referred to as "sell side" users in this capacity. However, content producers need not be sellers of financial services. In this embodiment the term "content consumer" refers to users, parties, firms, organizations, and components involved in buying financial services. Content consumer users can be investors or representatives thereof, fund managers, and the like, which are often referred to as "buy side" users. In the examples herein discussing users, firms, companies, organizations, and similar entities, the term "party" can be considered generic to all of such entities.

Concerning the overall operation of the system 8 shown in FIG. 1, entities within the content producer party 11 generate content and provide such content 113 to the content distribution system 10 via the content producer computers 12. The content distribution system 10 receives and manipulates the content 113 to generate and send modified content 114 to the content consumer computers 14. Modified content 114 is configured to allow tracking of interactions 115 (e.g., who viewed it, duration of viewing, hyperlink clicks, etc.) that are returned from the content consumer computers 14 to the content distribution system 10. The content distribution system 10 collects and processes interactions 115 into interaction data 116 for consumption at the content producer computers 12. In the meantime, buying and selling occurs between various content producer parties 11 and content consumer parties 13. This can be facilitated by communications between the servers 16 and 18, by out-of-band interactions 21 (e.g., computer trading systems, meetings, telephonic communications, etc.), or similar techniques. When the time comes for the content consumer parties 13 to allocate commissions to specific content producer parties 11, the content distribution system 10 provides commission mappings 117 to the content consumer computers 14 for review, modification, and/or approval at the content consumer computers 14. The content distribution system 10 generates the commission mappings 117 based on the tracked interactions 115 of the content consumer computers 14 with the content 114, where increased interaction is generally translated into increased commission. Once the commission mappings 117 are finalized, the content distribution system 10 provides aggregated commission mappings 118 for each content consumer party 13 to the respective content consumer server 18. Then, when financial obligations are to be settled, the content consumer server 18 provides commission data 119 (e.g., payment amounts, payment instructions, etc.) based on the aggregated commission mappings 118 to the financial transaction computer system 17, which in turn operates to process payments or transactions with reference to the commission data 119 and report same to the respective content producer servers 16.

The commission mappings 117 can be compatible with a known voting scheme for allocating commissions. For example, some fraction of a content consumer party's votes can be selected for distribution via the commission mappings 117. The remainder of the content consumer party's votes can be allocated in the traditional manner. Alternatively, all of a content consumer party's votes can be selected for distribution via the commission mappings 117.

Figure 2:
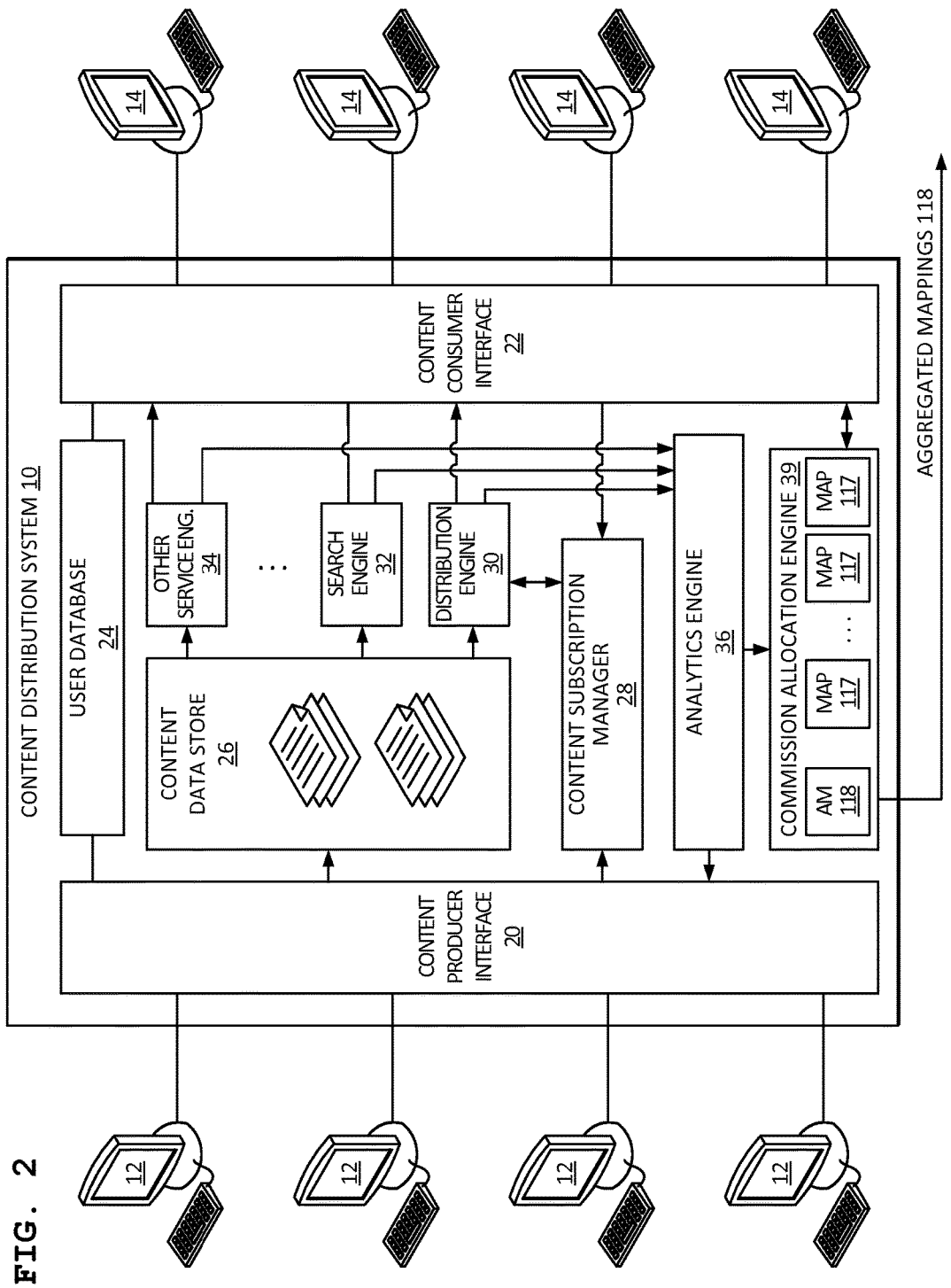
FIG. 2 is a block diagram of a content distribution system.

FIG. 2 shows a content distribution system 10 according to an embodiment of the present invention. FIG. 2 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The content distribution system 10 includes a content producer interface 20 configured to receive commands and data from the content producer computers 12 and output data and other information to the content producer computers 12. The content producer interface 20 can include a web server configured to serve webpages, which can include a login page for secure login by users of the content producer computers 12. Webpages served by the content producer interface 20 can be script-generated using various techniques and combinations thereof, such as server-side scripting (e.g., Ruby on Rails, ASP, PHP, among many others) and client-side scripting (e.g., JavaScript, jQuery, Ajax, among others).

The content distribution system 10 also includes a content consumer interface 22 configured to receive commands and data from the content consumer computers 14 and output data and other information to the content consumer computers 14. The content consumer interface 22 can include a web server, which can be the same web server used at the content producer interface 20 or can be a different web server configured to serve webpages. Other features and aspects of the content consumer interface 22 can be the same as or similar to the content producer interface 20.

The content producer and content consumer computers 12, 14 can each include a user agents, such as a web browser (e.g., Firefox, Internet Explorer, Google Chrome, etc.) configured to communicate with the respective interface 20, 22 and email clients (e.g., Microsoft Outlook, Gmail clients, etc.) configured to send and receive email with email servers (e.g., Microsoft Exchange, Gmail, etc.). Email servers are contemplated to form part of the network of each content producer and content consumer computer 12, 14.

Interactions between the computers 12, 14 and the interfaces 20, 22 can occur via the Web, email, a combination of such, as well as with similar technologies.

The interfaces 20, 22 and computers 12, 14 can additionally or alternatively be configured to use other communication techniques. For example, the interfaces 20, 22 communicate data according to known or new protocols and the computers 12, 14 can be provided with applications that consume such data and provide commands to the interfaces 20, 22.

The content producer computers 12 provide content to the content distribution system 10 and the content consumer computers 14 consume the content. In this embodiment, the content is related to the financial industry and can include content such as newsletters, alerts, special bulletins, articles, research papers, morning notes, etc. It is contemplated that content producer users create or otherwise obtain the content and upload it to the content distribution system 10. In a financial information embodiment, examples of content producer users include employees of equity trading firms, financial advisors, and the like. Buy-side users can use the content consumer computers 14 to obtain the content provided by the various sell-side users at the content producer computers 12. The content itself can be of interest to content consumer users and, further, can assist content producer users in selling financial services to content consumer users.

The content distribution system 10 further includes a user database 24 configured to store relevant content producer and content consumer user information, such as username, password, contact information (e.g., email address, telephone number, fax number, etc.), firm, mailing address, and real name. The user database 24 can store relevant information such as firm information, and associations between users and firms. For instance, several users can belong to the same firm and the user database 24 can indicate such. The user database 24 can further store roles of various users, such as trader, manager, administrator, director, president, etc. Roles can be associated with permissions within the content distribution system 10. The user database 24 can explicitly identify whether users and firms are content producer or content consumer. Lastly, each user and firm can be provided with unique identification information (an ID) that uniquely identifies the user or firm within the system 10. Components of the system 10 can use the ID as an index to lookup information about users and firms, such as email address, to facilitate content distribution.

The user database 24 can also store non-password authentication credentials, such as identity certificates. In order to access the content distribution system 10, users at the computers 12, 14 must first login and have their credentials verified. It is contemplated that access to the content distribution system 10 is restricted to users whose real-life identities have been confirmed. Accordingly, the user database 24 can include an administrator-editable field indicating whether a user's real-life identity has been confirmed or whether such confirmation is pending.

The content distribution system 10 further includes a content data store 26. The content data store 26 is configured to store the items of content discussed above. The content data store 26 can include one or more databases and can include local and/or distributed (e.g., "cloud") storage. The content data store 26 can be configured to index the stored content by any number of suitable criteria including: date written, date published, title, description, author, author's firm, industry sector, type of financial product (e.g., equity, derivative, etc.), tag(s) or keyword(s), word length, and other relevant metadata. Content can include text and images and can be in the form of stored email messages, hypertext markup language (HTML) documents or fragments, PDF files, text files, electronic calendar invitations, electronic calendar invitation acknowledgements, video, audio, voice messages, recordings of telephone calls, structured data objects having user-entered information concerning face-to-face or other interactions, or similar. Content can include hyperlinks to other content stored in the data store 26 or elsewhere on the Internet. Content can be stored in association with relevance values, which can be associated with one or more of sector and product.

The content distribution system 10 further includes a content subscription manager 28. The content subscription manager 28 controls how and whether content from the content data store 26 is available to the content consumer computers 14. The content subscription manager 28 is configured to handle content consumer requests to obtain, subscribe to, and unsubscribe from various content. For example, a content consumer user can wish to request delivery of a particular content producer newsletter email. Content producer users can also use the content subscription manager 28 to control distribution of their content. That is, the content subscription manager 28 is configured to handle content producer requests to publish, distribute, and cease distributing content. As will be discussed in detail below, the content subscription manager 28 also provides various rules as to whether and how content from various content producer users can be provided to various content consumer users.

The content distribution system 10 further includes a content distribution engine 30. The distribution engine 30 is configured to distribute content in conformance with settings and rules established at the content subscription manager 28. The distribution engine 30 effects actual delivery of the content provided by the content producer computers 12 to the content consumer computers 14. The distribution engine 30 can be configured to generate and send email or other types of messages containing content stored at the data store 26. In some examples, the distribution engine 30 is configured to receive a content-bearing source message from a content producer party, generate a plurality of addressed outgoing messages including tracking information (e.g., tracking images, hyperlink tracking codes, and/or similar) for the distribution of the source message, and send the plurality of outgoing messages to a message server of the content producer party for actual delivery to the addresses of the content consumer parties identified in the distribution. This enables the content producer party to maintain control over the messages sent. The term "engine" is used herein to denote one or more methods or processes configured to arrive at a general goal, and is not to be taken as limiting to particular technology or implementation.

The content distribution system 10 can further include a search engine 32. The search engine 32 can be configured to receive queries from content consumer computers 14 and return relevant items of content stored in the data store 26. The search engine 32 can reference any indexing of the content (e.g., author, tag, etc.), as discussed above, as well as relevance of the content. The search engine 32 can be configured to deliver a selected relevant item of content to the searching content consumer computer 14 in the form of, for example, a webpage containing the item content.

The content distribution system 10 can further include one or more other service engines 34 configured to allow content consumer users to discover and obtain content from the content data store 26.

The content distribution system 10 further includes an analytics engine 36. The analytics engine 36 is configured to receive content engagement information from the content distribution engine 30, search engine 32, and any other service engines 34. Content engagement information can include indications of whether content was viewed, who viewed the content, a duration of time that content was viewed, whether hyperlinks in the content were clicked, and similar. The analytics engine 36 outputs various views of analytics to the content producer interface 20 and outputs analytics data to the commission allocation engine 39.

The content distribution system 10 further includes a commission allocation engine 39 connected to the analytics engine 36 to receive indications of content interaction. The commission allocation engine 39 is configured to store commission mappings 117 and process commission mappings 117 for review, modification, and/or approval by one or more of the content consumer computers 14. The commission allocation engine 39 is configured to assemble finalized commission mappings 117 into aggregated commission mappings 118 and send such to the respective content consumer party 13 for resolution and, if applicable, associated commission payments to the respective content producer parties 11. In other embodiments, the commission allocation engine 39 can be provided in a system that is distinct and separate from the content distribution system 10.

Figure 3:
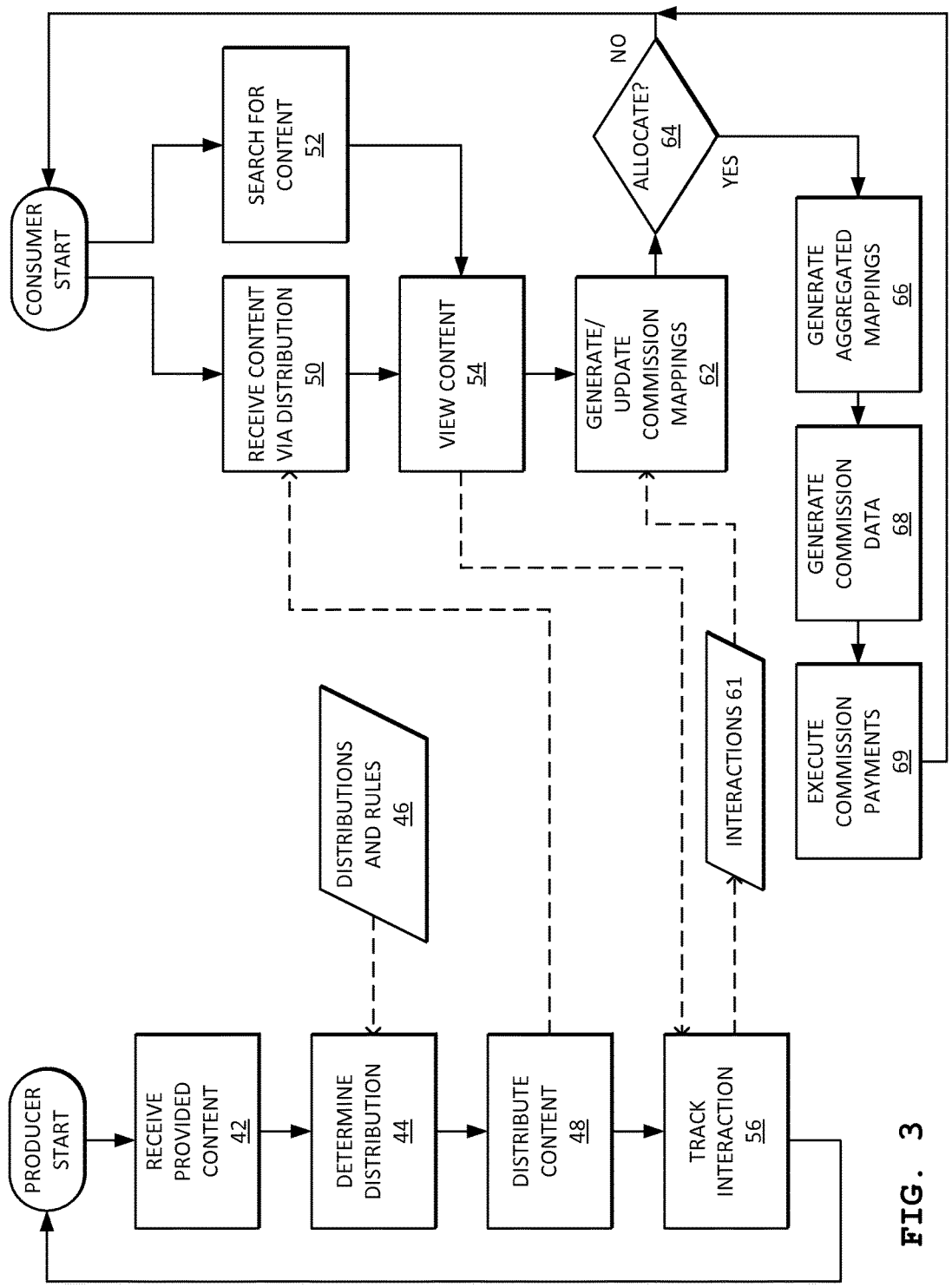
FIG. 3 is a flowchart of a method of distributing content and analyzing content engagement.

FIG. 3 illustrates methods according to the present invention. The methods are shown with illustrative blocks or steps connected by solid lines. Data communication between methods is generally shown in dashed line. The methods of FIG. 3 will be described with reference to FIGS. 1 and 2, but this is not intended to be limiting and the methods can be used with other systems. The blocks/steps can be performed in sequences other than shown.

At 42, content is provided by content producer users. The content distribution system 10 receives content from various content producer users via content producer computers 12 and the content producer interface 20. Content is stored at the data store 26 until a scheduled time for delivery or until content is requested by content consumer users by, for example, a search.

At 44, distribution for various items of content is determined by the content subscription manager 28. Distributions and rules governing distribution 46 can be referenced. Distributions can be editable by content producer and content consumer users, so that content producer users can add content consumer users to distributions, content consumer users can add themselves to public content distributions, content producer users can remove content consumer users from distributions, and content consumer users can remove themselves from distributions. Rules can be inherent to a list of subscribers for a distribution, having been checked before each subscriber was added, or can be checked or effected on a list of subscribers, at 44. As will be discussed in detail below, rules can be used to ensure compliance with spam and/or securities laws.

Then, at 48, the content distribution engine 30 delivers the content to content consumer computers 14 in accordance with the distributions and any rules 46 maintained by the content subscription manager 28. Content can be distributed directly to the content consumer computers 14 or can first be delivered to a server, such as server 18, within the domain of the content consumer computers 14 for subsequent delivery to the content consumer computers 14. Content consumer users receive the content at 50. Content consumer users can also use the search engine 32 or other service engine 34 to discover and obtain content, at 52.

The content, whether received via email via a distribution or obtained via search or other method is then presented to the content consumer user, at 54. Content consumer user interaction with the content is tracked, at 56. Tracked interactions 61 can include detecting content opening/viewing, measuring a length of time content is viewed, and the monitoring of clicking of hyperlinks within the content, among others. Content interaction data is then fed into the analytics engine 36, so that such interactions can be studied by content producer users. Tracked interactions 61 can also be measured for content consumer users who were not the original or intended recipients of the content, as may happen, for instance, when an original or intended recipient forwards an email bearing the content to another user.

Tracked content interactions 61 are also used to generate or update commission mappings, at 62. That is, tracked interactions performed by content consumer users, such as those discussed above, are mapped to content producer users. Mappings can further be based on rules, such as different weightings for different kinds of interactions. For instance, opening an email message containing a particular content item can be weighted less than viewing the content item for a specified duration of time, whereas forwarding the message to another user can be weighted more. In some examples, each mapping is specific to one of the content producer users and quantifies the engagement of consumer users with content generated by the respective content producer user. Mappings can also be configured to account for email messages forwarded to parties who are not registered with the content distribution system 10 and who may not be aware of the commission allocation techniques discussed herein. Such mappings can be based on rules distinct from rules for registered users who subscribe to the content.

At 64, it is determined whether commissions to be allocated based on the commission mappings. This determination can be made responsive to an external trigger, such as an input at one of the content consumer computers 14, can be made according to periodic logic (e.g., monthly, quarterly, etc.), or can be made according to other logic. Commission allocations can be made based on past interaction data (e.g., at end of current quarter) for future activities (e.g., trades expected to be conducted during the next quarter). Alternatively or additionally, commission allocations can be made based on past interaction data (e.g., at end of current quarter) for past activities (e.g., trades actually conducted during the current quarter)

If commission allocations are to be processed, aggregated mappings are generated, at 66. A specific aggregated mapping can contain representations of commissions allocated by various different content consumer users at a specific content consumer party 13 and destined for all content producers at a specific content producer party 11.

At 68, aggregated mappings are processed into commission data according to formats suitable for transmission to the relevant financial transaction computer systems 17. When commission allocations are made for future activities, the aggregated mappings processed at 68 can be those generated for the previous quarter. That is, aggregated mappings generated at 66 lag the commission data generated at 68 by a specific time period, such as one quarter. Generating commission data can also take into account offsets representative of agreements between specific content producer parties 11 and content consumer parties 13. For example, a commission payment can be held in case expected future consideration will cause an adjustment to the payment.

In another example, a particular content producer party 11 can require that a commission payment, or portion thereof, be provided to a third party, such as a freelance content producer or the like. Aggregated mappings reflect content contributed by third parties and further identify interactions with such content. Hence, parties who have benefited from the content can use the aggregated mappings to provide payment to such third parties. In one example, content producers who also sell financial instruments related to the content (e.g., sell-side content producers) pay third parties a portion ("soft checks") of the total commission received according to the aggregated mappings. In another example, content consumers who also buy financial instruments related to the content (e.g., buy-side content consumers) pay third parties a portion of the total commission due to the buy-side content producers according to the aggregated mappings. In still another example, buy-side content consumers and/or sell-side content producers provide funds according to the aggregated mappings to an intermediary (e.g., the operator of the content distribution system 10) who then pays the third parties according to the aggregated mappings. All of these examples advantageously allow efficient, accurate, and justifiable payments to third parties for their content. When the intermediary is used, the identities of the payers and payees can be kept anonymous, thereby potentially reducing human interference in the process, which may reduce its accuracy and efficiency.

Lastly, at 69, commission data is sent to the relevant financial transaction computer systems 17 for processing and payment to the content producer parties 11 and/or other entities. Alternatively or additionally, the commission data is sent to one or more of the relevant parties to inform future action, which may include payment.

The content producer method 42-48 and 56 and the content consumer method 50-54 and 62-69 are asynchronous with respect to each other. That is, actions in a given method are not conditional on actions in another of the methods. To illustrate, content producer users can provide and distribute content 42-48 without any content consumer users viewing such content. Content consumer users can view previously provided content 50-54 without any new content being provided by the content producer, and commission mappings and payments 62-69 can be performed based on tracked historic interactions. However, it is worth noting that, despite the asynchronous nature of the methods, each method provides information that is important to at least one other method. For example, the content producer method 42-48 and 56 provides content to the content consumer method 50-54 and 62-69, which in turn provides content interaction data and commission payments to the content producer users.

Content consumer users benefit from the nature of content, as they currently do. Further, content consumer users benefit from a single system 10 that provides a unified content consumer interface 22 through which content consumer users can manage their subscriptions to content, discover new content, and allocate commissions to content producer users. For example, a content consumer user can readily use the system 10 to find and subscribe to a newly available newsletter in the content consumer user's sector. Content consumer users also benefit from the ability to allocate commissions in a convenient and transparent manner.

Content producer users benefit from a central system in which to publish and distribute content, as well as obtain analytics of content consumer user engagement with the content. Such analytics can be correlated to commission payments to help content producer users improve the nature of their content and its delivery. Informative and highly engaging content is thus rewarded.

Using the commission mappings improves accuracy and data integrity over past systems in that indications of engagement with the content are used to arrive at commission allocations, with such indications of engagement being calculated and deterministic. Further, assembling a bundle of past commission mappings into an aggregated commission mapping improves network efficiency, as the aggregated commission mapping need only be communicated over the network once for each of the relevant parties. Further, generating the commission mappings and aggregated commission mappings asynchronously to tracking interactions with the content advantageously reduces total delay in that, for example, an unexpected delay in recording an interaction (as may occur in computer networks) does not hold up the generation of the commission mappings and aggregated commission mappings.

Figure 4:
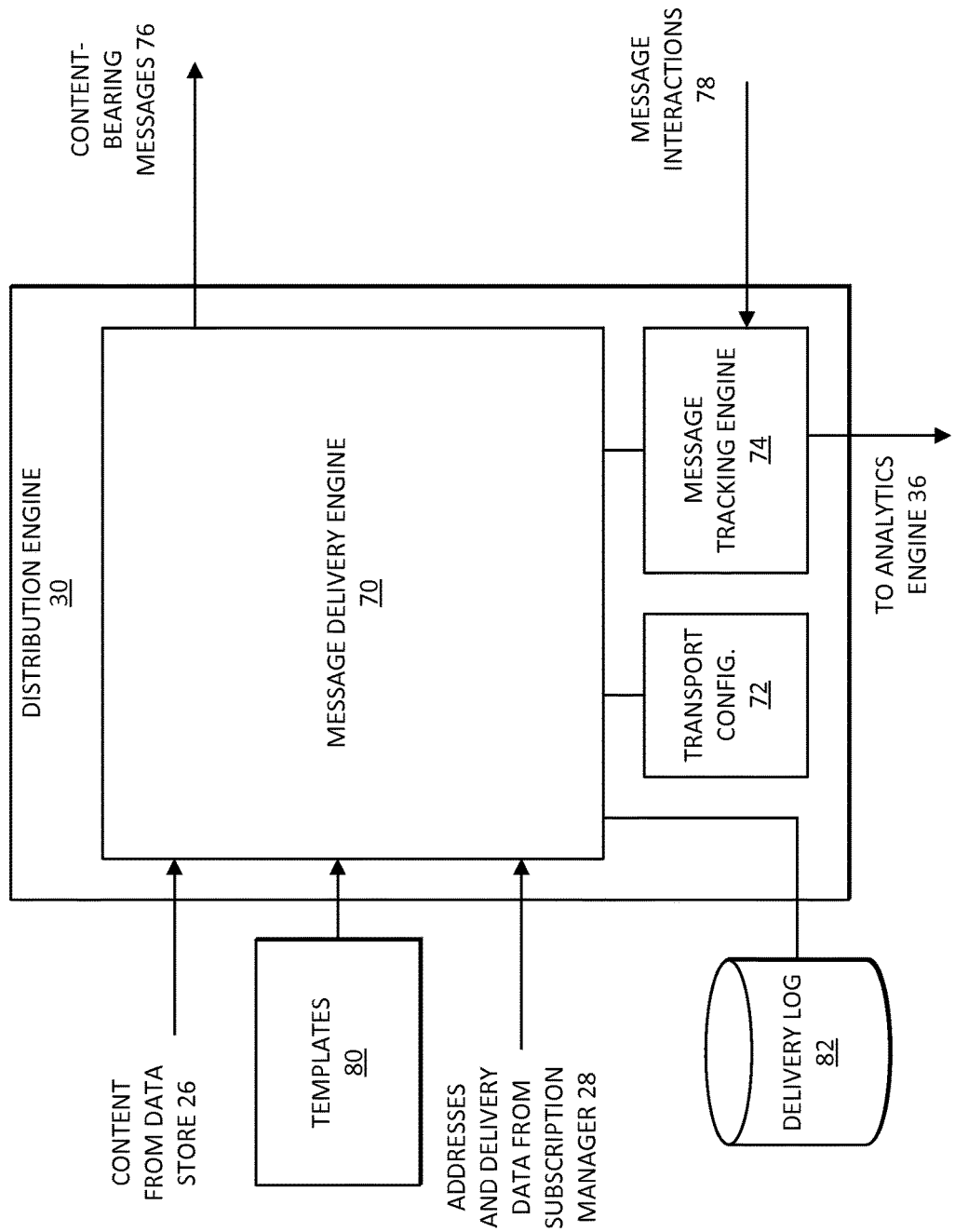
FIG. 4 is a block diagram of a distribution engine.

With reference to FIG. 4, the content distribution engine 30 includes a message delivery engine 70, a transport configuration 72, and a message tracking engine 74. FIG. 4 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The message delivery engine 70 is provided with content from the data store 26 and is configured to insert the content into content-bearing messages 76 destined for content consumer users. In this embodiment, the message delivery engine 70 includes a simple mail transfer protocol (SMTP) mailer program or the like. Content-bearing messages 76 can be HTML-encoded email messages into which content is inserted within an HTML element, such as a DIV element. The message delivery engine 70 can be configured to handle scheduling, bounces/retries, undeliverable notifications, and other sundry aspects of email message delivery.

The message delivery engine 70 can also be configured to pre-process hyperlinks contained within content, so that hyperlinks targeting content outside the content distribution system 10 are rewritten to targets within the system 10 for tracking purposes. In an example of such a technique, a hyperlink originally in the content can be provided as a uniform resource locator (URL) parameter of a rewritten hyperlink. That is, a hyperlink to "www.example.com/article.htm" within the content can be rewritten as "www.contentdistributionsystem.com/redirector?target=www.example.com/article.htm&tracking_code=91008457", so that a redirector within the system 10 can monitor link tracking codes, and thus monitor clicks of hyperlinks within the content, before redirecting the user agent to the original URL ("www.example.com/article.htm"). Other techniques for tracking hyperlink selections can be used, as will be apparent to those of skill in the art.

The message delivery engine 70 is also provided with addresses from the subscription manager 28. Addresses include one or more destination addresses for a particular content-bearing message 76, and can also include copy addresses, blind copy addresses, and reply-to addresses. In the example of email, a list of destination email addresses, which belong to content consumer users who have subscribed to particular content, can be provided to the message delivery engine 70 by the subscription manager 28. The subscription manager 28 can also provide a reply-to email address, so that the receiving content consumer users can respond directly to the content producer user originating the message rather than replying to the message delivery engine 70. The subscription manager 28 can further provide other delivery data such as whether or how a particular message 76 is to be tracked and whether or how delivery of a particular message is to be logged.

The transport configuration 72 is a file or other data structure that stores configuration data, such as the protocol (e.g., SMTP) and settings with which to send the content-bearing messages 76. The transport configuration 72 can also be configured to insert tracking information into messages 76, such as tracking images and hyperlink tracking codes.

The message tracking engine 74 monitors content consumer user interactions 78 with the content-bearing messages 76 after the messages 76 are delivered. Various interactions can be monitored. The message tracking engine 74 can be configured to track the loading of a tracking image inserted into a message 76 to determine whether the message 76 has been opened or viewed, as well as which Internet protocol (IP) address requested the image. The tracking engine 74 can be configured to query an image server to obtain this information about the image. The image server can be configured to throttle a rate of delivery of the tracking image (e.g., 1 bit per second), so that the message tracking engine 74 can determine message viewing duration by querying the image server to obtain the image delivery status (i.e., number of bits delivered). The more bits of the tracking image delivered, the longer the message has been viewed. Different tracking images can be used to track message opening and message viewing duration. The message tracking engine 74 can also be configured to monitor clicking of hyperlinks within messages 76, which can be achieved by the rewriting and redirecting technique discussed above. Output of the message tracking engine 74 is made available to the analytics engine 36 as content interaction data and such data can be date- or time-stamped by the message tracking engine 74.

It is also contemplated that message interactions 78 can include explicit feedback from content consumers. Specifically, messages 76 can include interactive buttons (activating a suitable hypertext tracking link when clicked, touched, tapped, or otherwise activated, by a user) or similar features, which the user is asked to click or otherwise interact with if they found the content of the respective message 76 to be useful or of interest. Further, message interaction 78 can comprise a reply email, etc.

Output of the message tracking engine 74 can also be used to update relevance values of the content.

The message delivery engine 70 can also be configured to reference templates 80 when generating content-bearing messages. Templates 80 can be provide in HTML and can contain general information about a content producer firm (e.g., name, logo, letterhead, address, etc.), or specific information of the content producer user (e.g., name, branch office, sector, etc.), sending a particular content-bearing message 76. Templates 80 can be shared among multiple content producer users belonging to a content producer firm. Accordingly, templates 80 can provide a consistent appearance to content-bearing messages 76 despite such messages being sent by different content producer users and containing different content.

The message delivery engine 70 can also be configured to write to a delivery log 82 to maintain a history of messages sent for compliance with relevant laws, such as anti-spam laws and securities trading laws. An example log entry includes delivery timestamp, sender email address, name or email address or other identifier of the distribution, recipient email address, and message subject.

Figure 5:
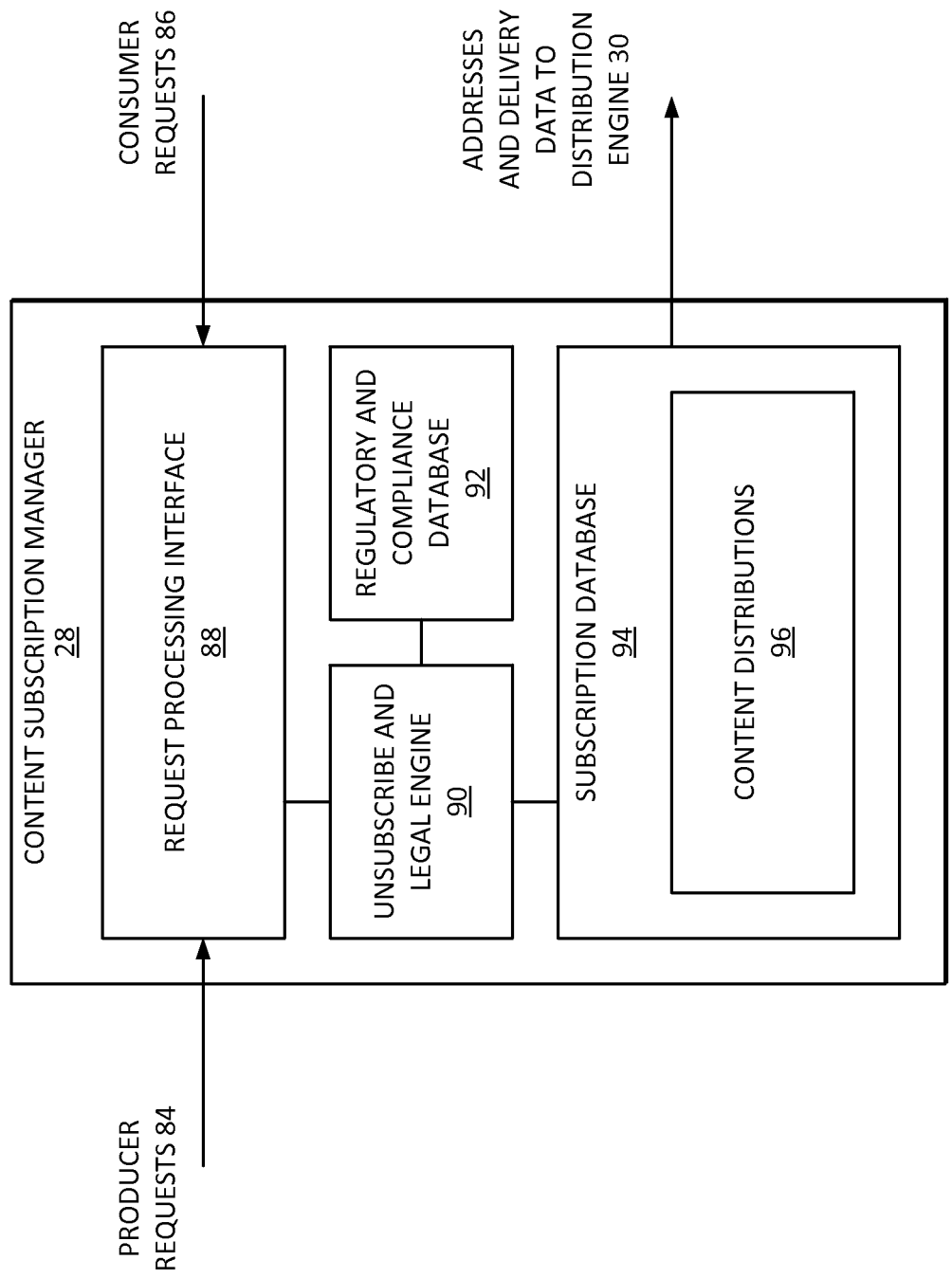
FIG. 5 is a block diagram of a content subscription manager.

FIG. 5 shows the content subscription manager 28. FIG. 5 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The subscription manager 28 is configured to process content producer requests 84 and content consumer requests 86 to add, remove, or modify content subscriptions for various users and distributions. For instance, a content producer request 84 can request that a particular content consumer user be added to a particular content distribution. A content consumer request 86 can similarly request that the requesting content consumer user be added to a content distribution. Requests 84, 86 can also be configured to remove content consumer users from content distribution or change how content consumer users are to receive content (e.g., change frequency of delivery, time of delivery, mailbox to receive deliveries, etc.).

The content subscription manager 28 includes a request processing interface 88. The request processing interface 88 handles incoming requests 84, 86 by passing requests to an unsubscribe and legal engine 90 and providing responses to requesting users. The request processing interface 88 can include one or more webpage forms available via the content producer and content consumer interfaces 20, 22 (FIG. 2).

Incoming requests are processed by the unsubscribe and legal engine 90 with reference to a regulatory and compliance database 92. The unsubscribe and legal engine 90 is configured to process content consumer requests 86 to unsubscribe from particular content. Such unsubscribe requests can arrive via an unsubscribe button at the request processing interface or via a hyperlink within a content-bearing message.

The unsubscribe and legal engine 90 is further configured to deny requests 84, 86 that violate rules established in the regulatory and compliance database 92. For example, a content producer user can require explicit permission from a content consumer user to add the content consumer user to a content distribution. The regulatory and compliance database 92 can further include rules for logging delivery of content-bearing messages sent to particular users. The regulatory and compliance database 92 can further include rules for tracking message interactions, so that the message delivery engine 70 can include or exclude tracking codes/images accordingly. The regulatory and compliance database 92 can further include rules governing insider trading or other securities trading concerns, so as to deny requests 84, 86 that can violate securities laws. Generally, the unsubscribe and legal engine 90 and using a regulatory and compliance database 92 are configured to ensure that content distribution meets legal requirements.

Content consumer and content producer users can have their legal jurisdiction (e.g., country of residence) stored in the user database 24 (FIG. 2), and the unsubscribe and legal engine 90 can be configured to reference the jurisdiction of a user when interacting with the regulatory and compliance database 92 and determining whether a request 84, 86 will be denied or allowed.

The request processing interface 88 can also be configured to allow users to approve pending request from other users. For example, a particular distribution can be private, in that only approved or invited content consumer users are allowed to subscribe. Accordingly, the request processing interface 88 can provide a web form for a content consumer user to request a subscription and provide a web form for the associated content producer user to approve or deny the subscription request. Similarly, privacy legislation in a content consumer user's country of residence can require explicit opt-in to email communications. Hence, the request processing interface 88 can provide a web form for a content producer user to request content delivery to a content consumer user and provide a web form for the content consumer user to approve or deny content delivery.

The content subscription manager 28 includes a subscription database 94 that stores subscription information, which can take the form of content distributions 96. Content distributions 96 can contain an association of content producer content to content consumer users, so that particular content can be delivered to the subscribing content consumer users. Content producer content can be indicated by a content producer user ID or by distribution ID. In the former case, content consumer users subscribe to all content form a particular content producer user. In the latter case, content producer users subscribe to particular content, such as a particular morning note. The latter can be preferable when a content producer user produces different types of content or operates in different sectors. The content distributions 96 can contain or be associated with delivery data indicative of whether content-bearing messages should be logged and tracked.

Figure 6:
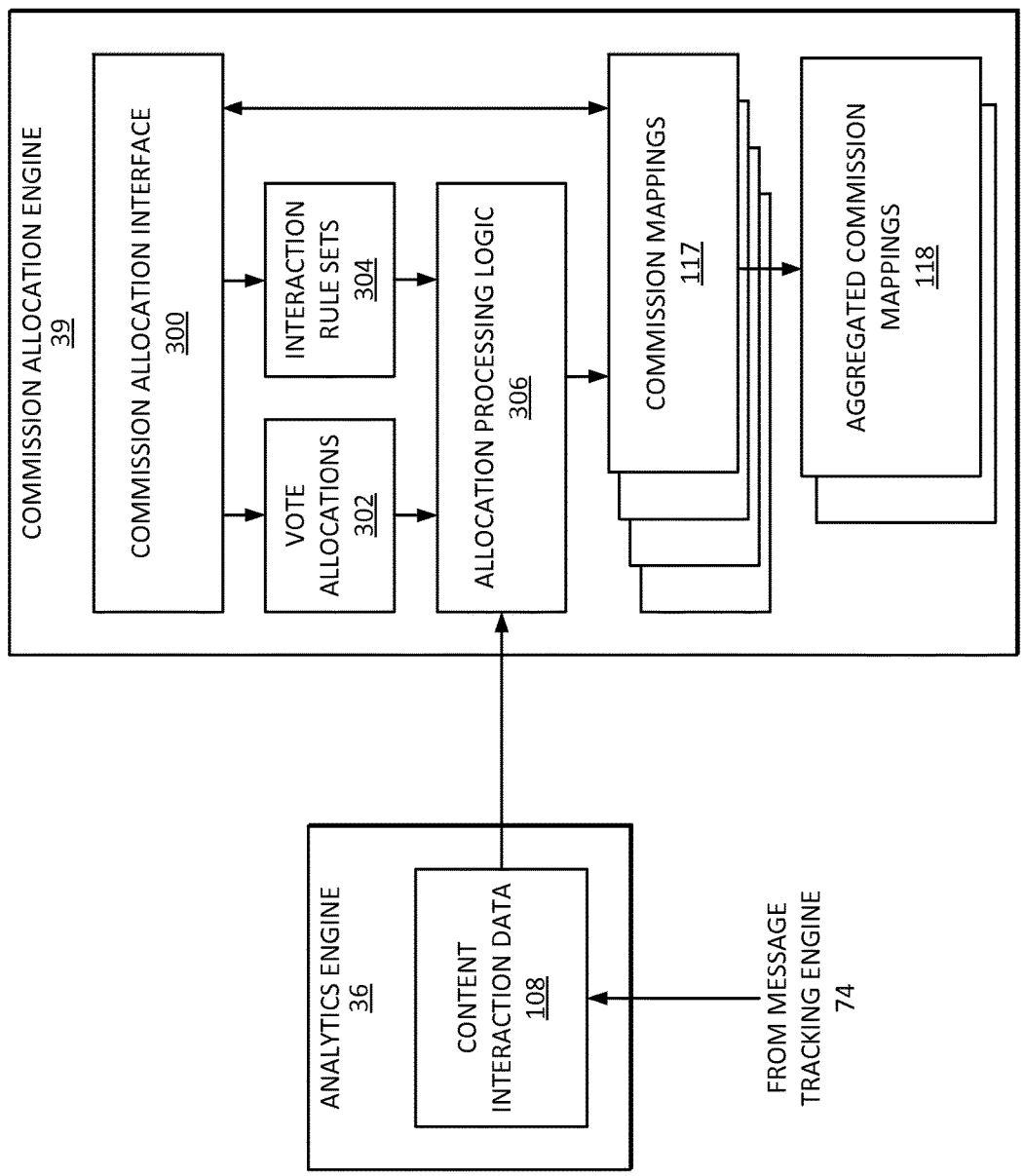
FIG. 6 is a block diagram of an analytics engine and a commission allocation engine.

FIG. 6 illustrates the analytics engine 36 and the commission allocation engine 39. FIG. 6 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The analytics engine 36 is configured to receive content interaction data 108 from the message tracking engine 74 and store content interaction data 108. Content interaction data 108 can be stored indefinitely to permit historical analysis. The content interaction data 108 can be received as time- or date-stamped from the message tracking engine 74, as discussed above, to permit temporal correlation with commission mappings.

Content interaction data 108 can be stored in association with subscriber/user ID and distribution ID. Hence, any information about a user who interacted with content can be obtained.

The commission allocation engine 39 includes a commission allocation interface 300, vote allocations 302, interaction rule sets 304, allocation processing logic 306, commission mappings 117, and aggregated commission mappings 118.

The commission allocation interface 300 can take the form of a webpage or similar user interface that presents an input/output interface via the content consumer interface 22 to the content consumer computers 14.

The vote allocations 302 include numbers of votes from various content consumer parties allocated for distribution by the content distribution system 10. Vote allocations 302 can include, for example, a list of content consumer party identifiers and associated numbers of votes. Votes are indications of commission and act as the basis for paying commission, and are thus the resulting output of the aggregated commission mappings 118. Votes can be assigned fractionally. Vote allocations 302 can be specific to a predetermined period, such as a quarter (e.g., cast 100 votes each quarter). Vote allocations 302 can be configured as modifiable via the commission allocation interface 300. A vote allocation 302 can be configured to be a maximum number of votes to assign. Alternatively, a vote allocation 302 can be configured to be specific number of votes to assign.

Each interaction rule set 304 defines one or more rules affecting content interactions. Rules can include weightings, conditions, exclusions, and similar. An example weighting assigns a proportional value to a particular content interaction. For example, opening a message bearing an item of content can be weighted as 1.5, whereas clicking on a link within the message can be weighted as 3.0. Hence, twice as many votes are given to link clicks as to message opening. An example condition defines a true/false precursor for a weighting to be assigned. For instance, a condition can stipulate at a message must be opened within 2 days of receipt for any weighting to be considered. An example exclusion is a condition that prevents assigning any weighting that would otherwise have been assigned. An exclusion can be selected to prevent assigning votes to content originating from a particular party, which can be useful certain for practical, legal, or conflict-of-interest reasons. For example, a large organization can have different parties that buy and sell the same type of financial instrument. In this case, an exclusion could be used to prevent buyers (i.e., content consumers) from assigning votes to sellers (i.e., content producers) in the same organization. Weightings, conditions, and exclusions can be combined for form complex rules to assign votes to various interactions by various content consumer users. Other types of rules are also possible. Interaction rule sets 304 can also be assigned priorities, such that a higher-priority rule set 304 can take precedence over a lower-priority rule set 304. Interaction rule sets 304 can further be implemented to cascade, such that multiple rule sets are applied to the same content interaction data 108, with a higher-priority rule set 304 being executed before a lower-priority rule set 304 is executed. A default interaction rule set 304 can be provided for parties that do not wish to establish their own rules or as a fallback in case no other rule set applies in a particular case.

Each interaction rule set 304 can be fixed or modifiable. A fixed interaction rule set 304 can be established to satisfy an industry regulator. For instance, a fixed interaction rule set 304 can stipulate a maximum number of votes that can be assigned to any one party. Fixed interaction rule sets 304 can be provided to the commission allocation interface 300 for viewing only, and can be stored in the content distribution system 10 in an area that is only accessible to administrators. A common fixed interaction rule set 304 can be used for all parties that allocate commissions. Various fixed interaction rule sets 304 can be used for different industries, different segments, different instruments, and the like. A modifiable interaction rule set 304 can be configurable through the commission allocation interface 300 by, for example, a content consumer user at a content consumer computer 14. Modifiable interaction rule sets 304 can represent rules for distributing votes, where such rules are determined by the various content consumer parties themselves. A common default modifiable interaction rule set 304 can be provided to all parties that allocate commissions.

In some embodiments, an interaction rule set 304 list numbers of votes to assign to particular interactions. Such embodiments are conducive to a vote allocation 302 storing a maximum number of votes. For example, as content is interacted with, votes are assigned. If votes run out, then no more are assigned for that quarter. In other embodiments, an interaction rule set 304 list weightings for particular interactions. Such embodiments are conducive to a vote allocation 302 storing a particular number of votes to assign. For example, as content is interacted with, weightings are assigned to interactions. Then, at a later time, the weightings are normalized to the total number of votes to assign, so that all votes are assigned. Various combinations of these techniques can also be used.

The allocation processing logic 306 is configured to execute the interaction rule sets 304 for content interaction data 108 received from the analytics engine 36, so as to transform vote allocations 302 into commission mappings 117. The allocation processing logic 306 can be implemented by a procedural program or script that, for example, passes content interaction data 108 to a generic rule function along with parameters extracted from one or more files that store the interaction rule sets 304. Such function can generate and output files that store the commission mappings 117. The allocation processing logic 306 can further be configured to transform commission mappings 117 into aggregated commission mappings 118 using another function that correlates commission mappings 117 to content consumer party 13.

Figure 7:
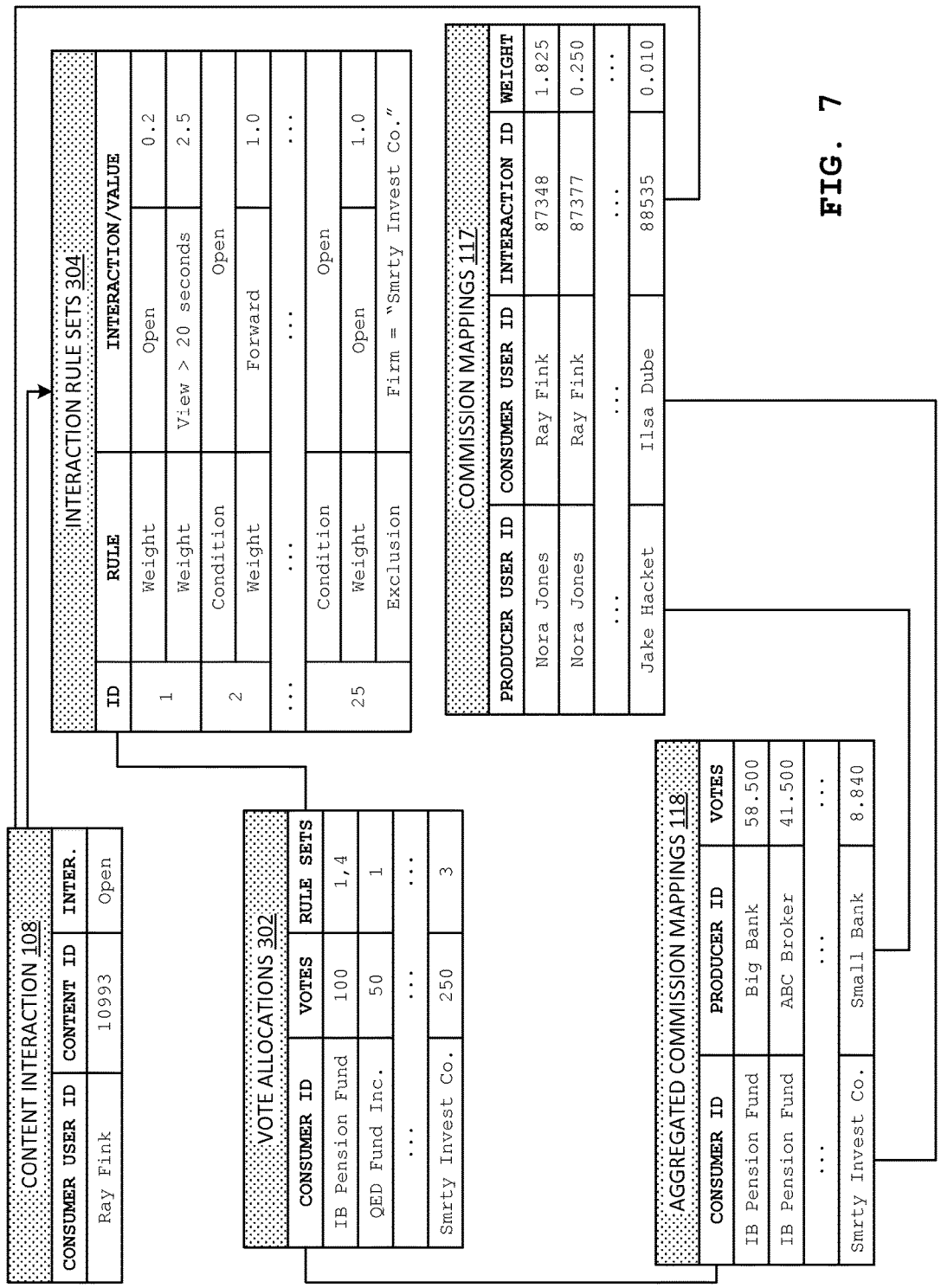
FIG. 7 is a schematic diagram of a data structure for commission allocation.

FIG. 7 shows a data structure for use with the present invention. The data structure is merely an example and is not intended to be limiting.

A content interaction 108, such as opening a content-bearing message, having a content-bearing message open for a duration of time, clicking a link inside a content-bearing message, forwarding a content-bearing message, or the like, is compared to interaction rule sets 304 by comparing an indication of the interaction (e.g., "Open") contained in the content interaction 108 with interactions and values contained in the interaction rule sets 304. Each content interaction 108 is linked to an item of content using a content identifier, which is associated elsewhere in the system with a content producer user who generated the content. Each content interaction 108 further contains a consumer user identifier that identifiers the consumer user who interacted with the content. In the example shown, "Ray Fink" opened content under content ID "10993", which can have been contained in an email message, webpage, or similar.

Interaction rule sets 304 associate rules with interactions and values. An example rule "1" calls for weighing opening of a message by 0.2 and weighing a long viewing of a message by 2.5. That is, for each opening of a content-bearing message a 0.2 weighting is assigned and each time a message is left open on screen for more than 20 seconds, a weighting of 2.5 is assigned. The example rule "2" requires the condition of a message being opened in order to assign a 1.0 weighting when the message is later forwarded. An example rule "25" requires the condition of a message being opened to allocate a weighting of 1.0, with consumer users associated with a particular firm causing this rule to abort.

Interaction rule sets 304 are linked to various content consumer party identifiers in the vote allocations 302, along with specific vote allocations for such parties. In the example shown, a firm "IB Pension Fund" has allocated 100 votes to rule sets 1 and 4. Vote allocations 302 can be effective for a predetermined period of time, such as a quarter, over which all weightings are normalized to the allocated votes. For example, if a sum of all weightings for a particular content consumer party is 592 over the quarter, then each 1.0 of weight is worth 0.169 votes (=100/592). Hence, a particular content interaction weighted at 0.2 would result in 0.034 votes going to the producer user of that content.

Commission mappings 117 store associations of content producer users, content consumer users, interaction identifiers associated with the respective content interactions 108, and calculated weightings from the application of the interaction rule sets 304. Hence, each interaction is tracked and assigned a value so that a content consumer user can later allocate votes to a content producer user based on the value of that interaction.

Aggregated commission mappings 118 are determined from commission mappings by associating each content consumer user with their respective organization (consumer ID) and associating each content producer user with their respective organisation (producer ID). Then, for each combination of consumer and producer, the weightings from the commission mappings 117 are normalized to votes (e.g., summed and then divided by the allocated votes from the vote allocations 302). Thus, the aggregated commission mappings 118 store the number of votes assigned by each content consumer party to each content producer party.

Aggregated commission mappings 118 thus represent translations of tracked content interaction into votes for producers of such content. The votes can be cast according to the prevailing tradition, such as to allocate commissions for the next quarter subsequent to the quarter during which the content was consumed, where such allocated commissions represent how much trading activity is to be undertaken with the associated content producer parties. In effect, content consumption is tracked and content producers are rewarded in a consistent, transparent, and deterministic manner.

A schematic of a portion of the commission allocation interface 300 is shown in FIG. 8. This portion of the commission allocation interface 300 is used by individual content consumer users and hence can be output to the content consumer computers 14.

Content producer users and their organizations are provided at region 320. A content summary 322 for each content producer user is provided to indicate to the viewing content consumer user whose content they consumed. The content summary 322 can provide a hyperlink or similar to expand details of the content. A calculated vote allocation 326 is shown for each content producer user. The calculated vote allocation 326 can be determined based on the techniques discussed herein. Specifically, the calculated vote allocation 326 can be based on commission mappings 117 (FIG. 7) for the particular content consumer user with weightings normalized to votes. An override vote field 328 is also provided, so that the content consumer user can override the calculated vote allocation 326 by entering a different vote allocation, which can then be stored in the commission mappings 117 (after being de-normalized, if necessary) for processing into the aggregated commission mappings 118.

In view of the above, it should be apparent that the techniques described herein offer numerous advantages to content producer parties, content consumer parties, and third parties involved in the creation, distribution, and consumption of financial information and data. Content consumer parties are provided with a convenient, deterministic, and transparent way in which to allocate commission to content producer parties. In addition, accuracy of commission allocations and the efficiency of communicating commission allocations can be improved. Further advantages will also be apparent to those skilled in the art.

While the foregoing provides certain non-limiting example embodiments, it should be understood that combinations, subsets, and variations of the foregoing are contemplated. The monopoly sought is defined by the claims.

What is claimed is:

1. A method of commission allocation in a computer system, the method comprising:
   generating a commission allocation interface to configure one or more interaction rule sets, the commission allocation interface for display at a content consumer computer operated by a content consumer party;
   generating commission mappings for a content producer party based on tracked interactions with distributed content by content consumer computers operated by the content consumer party and the one or more interaction rule sets, the distributed content originating from content producer computers operated by the content producer party, the distributed content being distributed via a computer network to the content consumer computers, the tracked interactions being indicative of engagement with the distributed content by the content consumer computers, the tracked interactions including activation of a hyperlink within a content item of the distributed content, each interaction rule set of the one or more interaction rule sets defining one or more rules for assigning a weighting to a tracked interaction;

transforming the commission mappings into an aggregated commission mapping for the content consumer party and the content producer party by correlating the commission mappings to the content consumer party and the content producer party and by processing correlated tracked interactions of the commission mappings into a quantified engagement of the content consumer party with the distributed content produced by the content producer party; and sending the aggregated commission mapping via the computer network to one or more computers operated by the content consumer party or the content producer party.

2. The method of claim 1, wherein transforming the commission mappings into the aggregated commission mapping is performed according to periodic logic that defines a duration of time over which the tracked interactions occurred.

3. The method of claim 1, wherein transforming the commission mappings into the aggregated commission mapping comprises normalizing assigned weightings to votes of a vote allocation configured by the content consumer party and specific to a predetermined period, the vote allocation being for effecting payment of commission by the content consumer party to the content producer party.

4. The method of claim 3, wherein different vote allocations for different content consumer parties are associated with different interaction rule sets.

5. The method of claim 4, further comprising outputting a calculated vote allocation based on the commission mappings to a particular content consumer computer, and receiving a different vote allocation from the particular content consumer computer to update the commission mappings before transforming the commission mappings into the aggregated commission mapping.

6. The method of claim 1, wherein a particular interaction rule set of the one or more interaction rule sets is configured to assign different weightings to different kinds of tracked interactions.

7. The method of claim 6, wherein the particular interaction rule set is configured to assign a weighting to a tracked interaction of opening an email message containing a content item of the distributed content, the weighting being less than a weighting assigned to a tracked interaction of viewing the content item for a specified duration of time.

8. The method of claim 1, wherein a particular interaction rule set is configured to assign one or more weightings to a tracked interaction of forwarding an email message containing a content item of the distributed content or to a tracked interaction of activating a hyperlink within a content item of the distributed content.

9. The method of claim 1, further comprising generating commission mappings for different content producer parties, the distributed content originating from content producer computers operated by the different content producer parties, the method further comprising transforming the commission mappings into aggregated commission mappings for different content consumer parties and the different content producer parties.

10. The method of claim 9, wherein the different content producer parties include sellers of financial services and third parties that are not sellers of financial services.

11. The method of claim 1, further comprising tracking interactions of the content consumer computers with the distributed content to obtain the tracked interactions.

12. The method of claim 11, wherein tracking interactions is performed asynchronously to generating commission mappings and transforming the commission mappings into the aggregated commission mapping.

13. A commission allocation engine comprising:

a processor to generate a commission allocation interface to configure one or more interaction rule sets, the commission allocation interface for display at a content consumer computer operated by a content consumer party;

the processor further to execute allocation processing logic configured to generate commission mappings for a content producer party based on tracked interactions with distributed content by content consumer computers operated by the content consumer party and the one or more interaction rule sets, the distributed content originating from content producer computers operated by the content producer party, the distributed content being distributed via a computer network to the content consumer computers, the tracked interactions being indicative of engagement with the distributed content by the content consumer computers, the tracked interactions including activation of a hyperlink within a content item of the distributed content, each interaction rule set of the one or more interaction rule sets defining one or more rules for assigning a weighting to a tracked interaction;

the allocation processing logic further configured to transform the commission mappings into an aggregated commission mapping for the content consumer party and the content producer party by correlating the commission mappings to the content consumer party and the content producer party and by processing correlated tracked interactions of the commission mappings into a quantified engagement of the content consumer party with the distributed content produced by the content producer party; and an interface coupled to the allocation processing logic and configured to send the aggregated commission mapping via the computer network to one or more computers operated by the content consumer party or the content producer party.

14. The commission allocation engine of claim 13, wherein the allocation processing logic is configured to transform the commission mappings into the aggregated commission mapping according to periodic logic that defines a duration of time over which the tracked interactions occurred.

15. The commission allocation engine of claim 13, wherein the allocation processing logic is configured to transform the commission mappings into the aggregated commission mapping by normalizing assigned weightings to votes of a vote allocation configured by the content consumer party and specific to a predetermined period, the vote allocation being for effecting payment of commission by the content consumer party to the content producer party.

16. The commission allocation engine of claim 15, wherein different vote allocations for different content consumer parties are associated with different interaction rule sets.

17. The commission allocation engine of claim 13, wherein the interface is further configured to output a calculated vote allocation based on the commission mappings to a particular content consumer computer, and to receive a different vote allocation from the particular content consumer computer to update the commission mappings before transformation into the aggregated commission mapping.

18. The commission allocation engine of claim 13, wherein a particular interaction rule set of the one or more interaction rule sets is configured to assign different weightings to different kinds of tracked interactions.

19. The commission allocation engine of claim 18, wherein the particular interaction rule set is configured to assign a weighting to a tracked interaction of opening an email message containing a content item of the distributed content, the weighting being less than a weighting assigned to a tracked interaction of viewing the content item for a specified duration of time.

20. The commission allocation engine of claim 13, wherein a particular interaction rule set is configured to assign one or more weightings to a tracked interaction of forwarding an email message containing a content item of the distributed content or to a tracked interaction of activating a hyperlink within a content item of the distributed content.

21. The commission allocation engine of claim 13, wherein the allocation processing logic is configured to generate commission mappings for different content producer parties, the distributed content originating from content producer computers operated by the different content producer parties, and wherein the allocation processing logic is further configured to transform the commission mappings into aggregated commission mappings for different content consumer parties and the different content producer parties.

22. The commission allocation engine of claim 21, wherein the different content producer parties include sellers of financial services and third parties that are not sellers of financial services.

23. A content distribution system comprising:
  a processor to generate a commission allocation interface to configure one or more interaction rule sets, the commission allocation interface for display at a content consumer computer operated by a content consumer party;
  the processor further to execute allocation processing logic configured to generate commission mappings for a content producer party based on tracked interactions with distributed content by content consumer computers operated by the content consumer party and the one or more interaction rule sets, the distributed content originating from content producer computers operated by the content producer party, the distributed content being distributed via a computer network to the content consumer computers, the tracked interactions being indicative of engagement with the distributed content by the content consumer computers, the tracked interactions including activation of a hyperlink within a content item of the distributed content, each interaction rule set of the one or more interaction rule sets defining one or more rules for assigning a weighting to a tracked interaction;
  the allocation processing logic further configured to transform the commission mappings into an aggregated commission mapping for the content consumer party and the content producer party by correlating the commission mappings to the content consumer party and the content producer party and by processing correlated tracked interactions of the commission mappings into a quantified engagement of the content consumer party with the distributed content produced by the content producer party;
  an interface coupled to the allocation processing logic and configured to send the aggregated commission mapping via the computer network to one or more computers operated by the content consumer party or the content producer party; and
  a message tracking engine configure to track interactions of the content consumer computers with the distributed content to obtain the tracked interactions.

24. The content distribution system of claim 23, wherein the allocation processing logic is configured to generate commission mappings and transform the commission mappings into the aggregated commission mapping asynchronously to the message tracking engine to tracking interactions.

* * * * *